Figure 1:
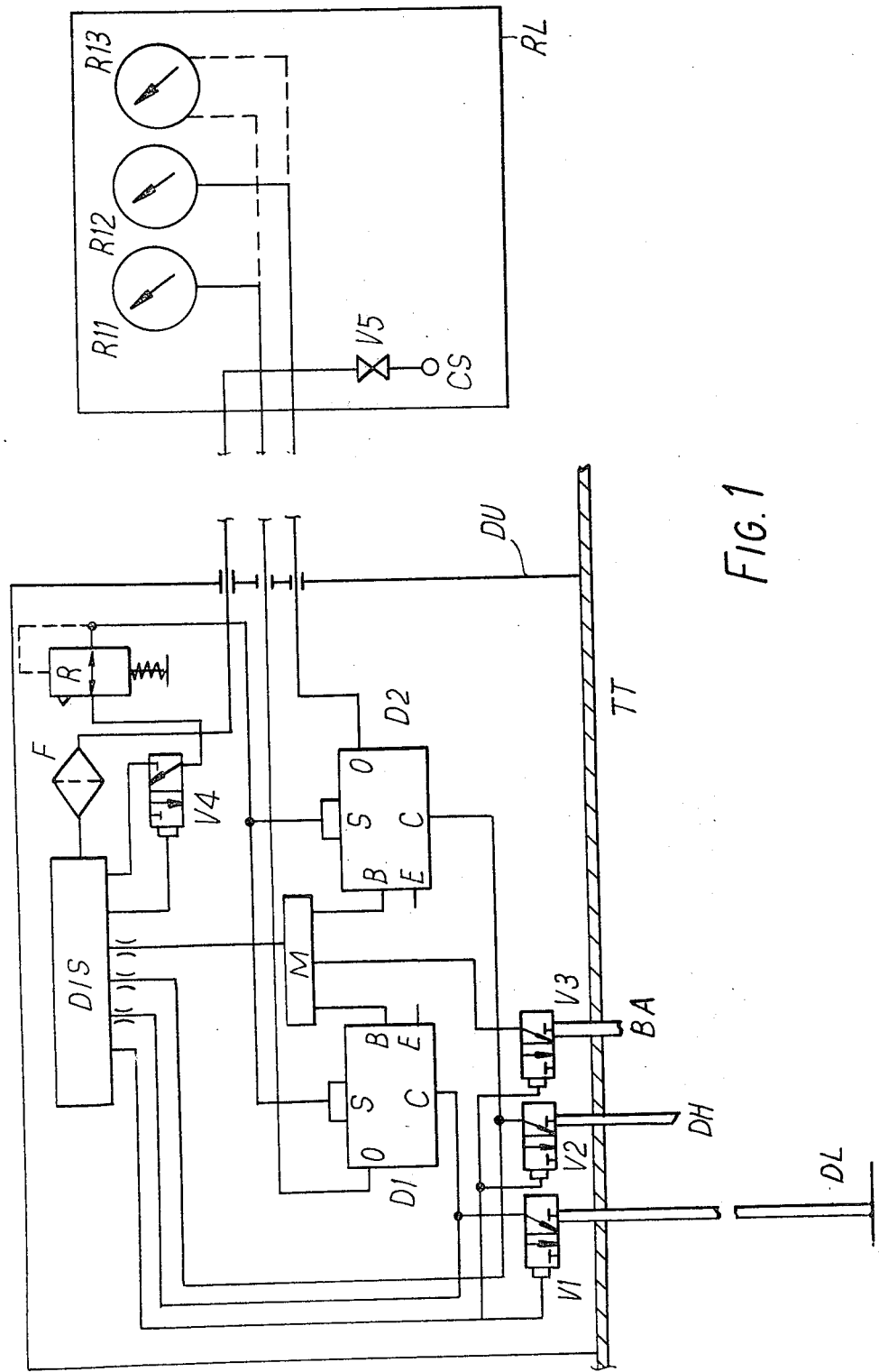

United States Patent [19]

Harrison

[11] 3,987,675

[45] Oct. 26, 1976

[54] PNEUMATIC LEVEL SENSING

[75] Inventor: Christopher Roland Harrison, Chippenham, England

[73] Assignee: Westinghouse Brake & Signal Company Limited, England

[22] Filed: May 29, 1974

[21] Appl. No.: 474,227

[30] Foreign Application Priority Data
June 8, 1973 United Kingdom............... 27389/73

[52] U.S. Cl. .................................................. 73/302
[51] Int. Cl.² ........................................ G01F 23/14
[58] Field of Search ................... 73/302, 407 R, 439

[56] References Cited
UNITED STATES PATENTS

| | | | |
|---|---|---|---|
| 2,331,208 | 10/1943 | Ludi..................................... | 73/302 |
| 2,427,690 | 9/1947 | Peterson ............................. | 73/302 |
| 2,736,199 | 2/1956 | Ibbott ................................. | 73/302 |
| 3,052,126 | 9/1962 | Laas..................................... | 73/407 |
| 3,169,402 | 2/1965 | Baker................................... | 73/407 |
| 3,380,463 | 4/1968 | Trethewey .......................... | 73/302 |
| 3,681,546 | 8/1972 | Coin et al. .......................... | 73/302 |
| 3,729,997 | 5/1973 | Luke................................... | 73/302 |

*Primary Examiner*—Herbert Goldstein
*Attorney, Agent, or Firm*—Larson, Taylor and Hinds

[57] ABSTRACT

A pneumatic liquid level sensing apparatus for marine tankers has a dip tube which by having air or gas applied to it bubbles into the liquid in a tank and produces a back pressure corresponding to the depth of the tube in the liquid, a pressure responsive valve device responsive to the back pressure relays a signal to a remote indicator and the provision of a balance pipe above the surface of the tanker liquid connected to a balancing input of the valve device enables the output of the valve device to be independent of the value of the air or gas pressure in the tank.

5 Claims, 4 Drawing Figures

PNEUMATIC LEVEL SENSING

This invention relates to pneumatic sensing of the level in a liquid tank and especially the level of liquid in a tank of a marine tanker.

According to the invention there is provided in a pneumatic liquid-level sensing apparatus having a first bubble dip tube in a tank and connected to a fluid pressure supply and to a back pressure responsive valve device, the device having a control input for receiving the back pressure and inlet, outlet and exhaust ports for fluid pressure from an indicating fluid pressure supply, a pressure responsive member responsive to said back pressure to control the fluid pressure at the outlet port denoted from the indicating fluid source, and the outlet port of the device being connected in a fluid pressure signal transmission path to a remote indicator of the outlet fluid pressure and thereby to indicate the back pressure produced by the immersion of the dip tube in liquid in the tank.

The device may have a linear characteristic and include a pile of pressure responsive members and bias means to compensate for non-linearity and zero-error in the response of the device.

The device may have a switching characteristic and include bias means to compensate for zero-error in its response.

There may be an isolating valve between the tank top and the device operable by an energising fluid pressure supply to open a connection between the dip tube and the device. The energising fluid pressure may be from a common source from which the other supplies are derived.

There may be a balance pipe between the tank top and the exhaust port and a balance port of the device to apply any non-atmospheric ambient pressure in the tank to the device. The balance pipe and the exhaust and balance ports may be connected to a manifold supplied with fluid pressure from the common source. There may be an isolating valve between the manifold and the balance pipe.

The arrangement may include two dip tubes and two devices with a common manifold, balance pipe and regulated transmission fluid pressure supply. The first dip tube may extend the whole depth of the tank and a second dip tube may extend only part of the depth of the tank. There may be an isolating valve in a connection between the common fluid pressure source and the common regulated supply operable by the energising fluid pressure supply to open the connection.

The remote indicator may include a pressure gauge for each device outlet pressure calibrated to display the depth of liquid in the tank. There may be a pressure gauge associated with the remote indicator and responsive to the difference in the outlet pressures of the two devices calibrated to indicate the specific gravity of the liquid in the tank.

The fluid pressure transmission path may extend between a tank top deck unit and a control console installed at the remote location, providing a path there between along which passage of liquid from a tank is prevented by an isolating valve, a pressure responsive member of the device and a transmission fluid pressure supply.

A deck unit for a marine tanker and pneumatic liquid-level sensing arrangement may include isolating valves for each of two dip tubes and a balance pipe, a back pressure responsive device for each dip tube having a control input connected to the outlet of the respective isolating valve and having inlet, outlet and exhaust ports for fluid pressure from a transmission fluid pressure supply, the unit having external connection for each outlet port and for a common fluid pressure source and including a distributor to distribute pressure from said source as a signal supply to each dip tube to provide said back pressure, to a regulator for the transmission of supply to said inlet port, to a manifold for the connection of balance port of the devices, exhaust ports of the devices and the balance tube and as an energising supply to control in the operation of isolating valves.

The dip tube isolating valve may be arranged to act as a proving valve for the remote indication by operation therefrom over to block the connection from the device to the dip tube. The device may include a linkage between the pressure responsive member and a valve control element displaceable via said linkage in response to said back-pressure to control fluid pressure supplied from a fluidic element to operate the fluidic element to control via a relay valve, the pressure in a fluid pressure transmission path. The control pressure of the relay valve may pass through a switching valve arranged for delayed response on the application of pressure to the arrangement from the common source.

Figure 2:
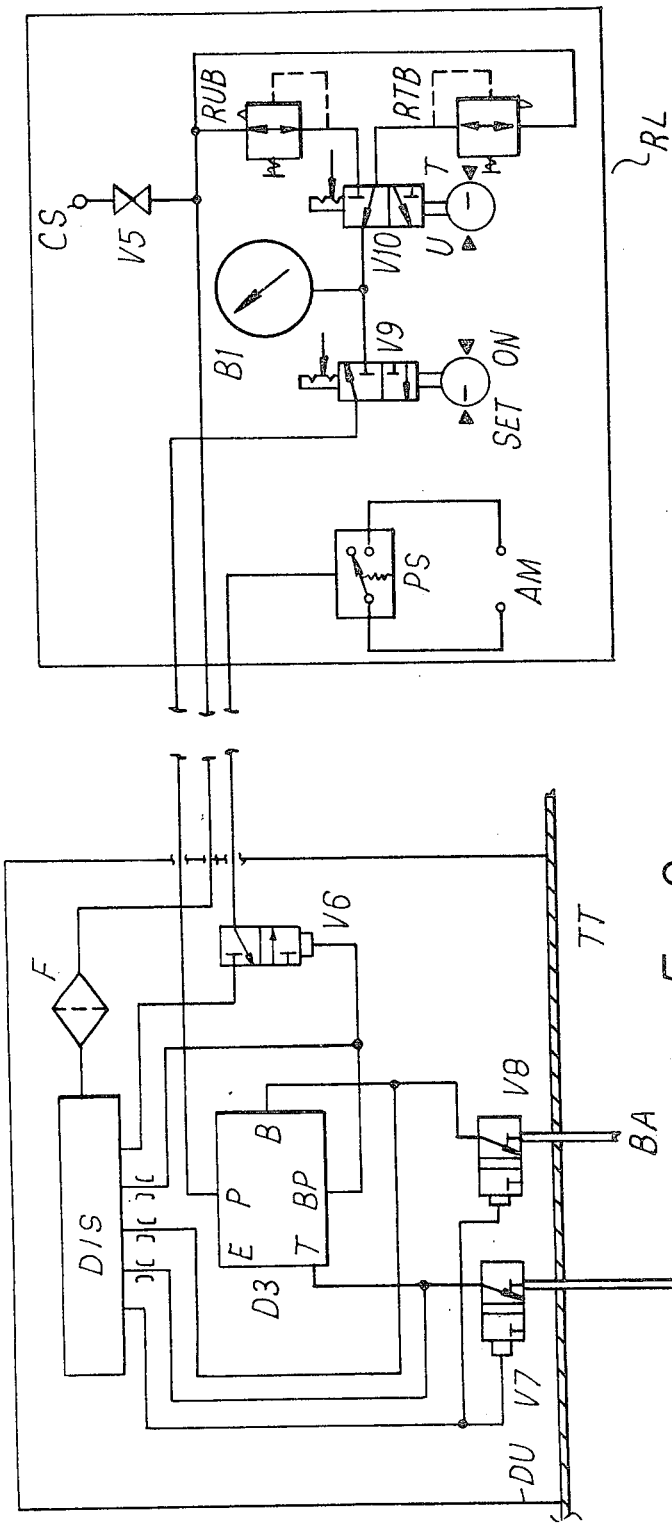
Figure 3:
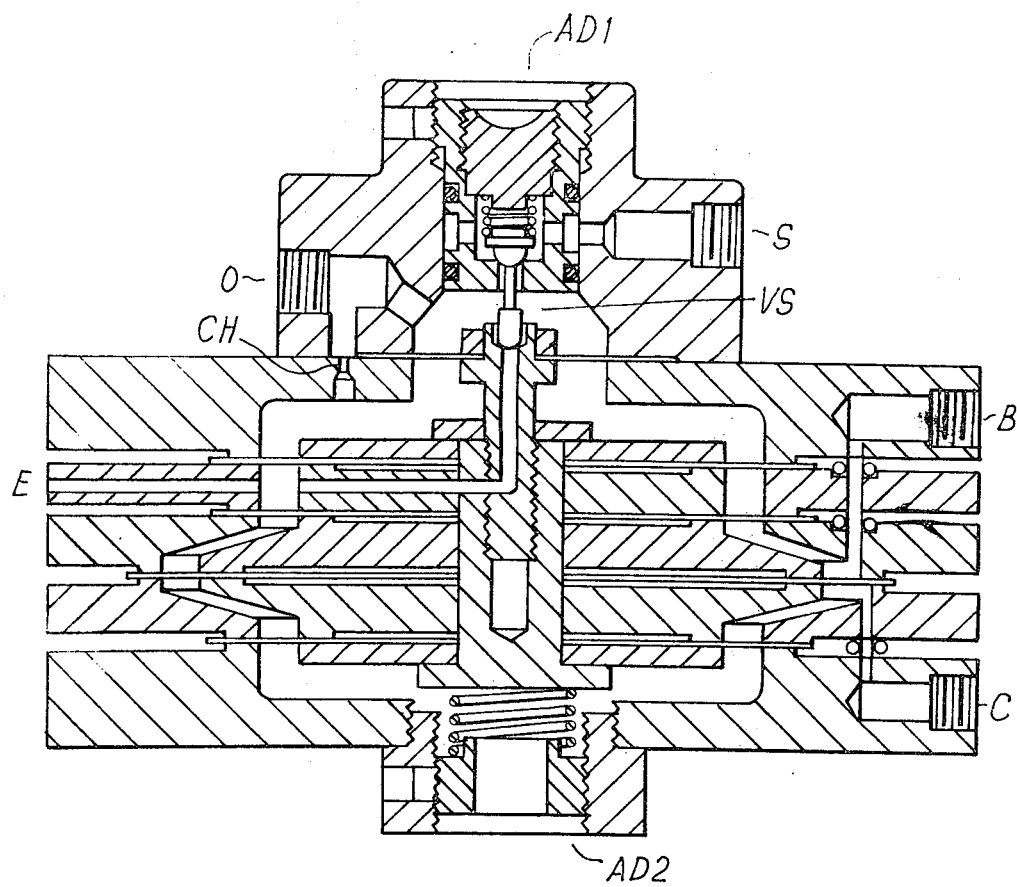
Figure 4:
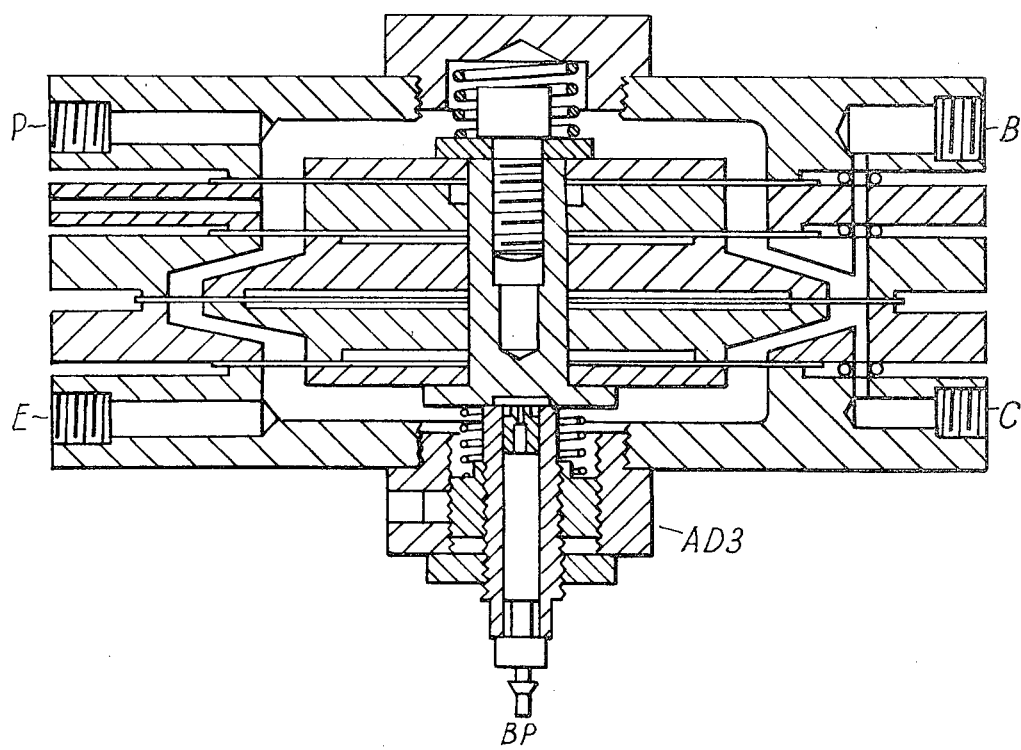

Embodiments of the invention will now be described with reference to the accompanying drawings in which:

FIG. 1 is a block schematic diagram of an arrangement to indicate the liquid level in a marine tanker tank, and FIG. 2 shows a block schematic diagram of an ullage level control arrangement for two different ullage levels and FIGS. 3 and 4 are cross-sections of valves utilizable in the embodiment of FIGS. 1 and 2.

When operating a marine tanker, particularly one for petroleum products, it is essential to be able to determine accurately the level of the product or other liquid in the tanks of the vessel. This is important because for economic reasons it is essential that the tank be filled to the highest acceptable level and that the filling takes place as rapidly as possible to reduce the time spent in port while it is necessary to prevent the overfilling of the tank with consequent loss of product and possible penalty for the pollution of the port area. Various arrangements have been proposed in the past for the measurements of the depth of the liquid in a tank in such circumstances. Apart from various mechanical methods depending on floats and linkages and electrical methods depending on either the passage of current through the liquid or some form of proximity sensing by capacity or inductive methods the most successful arrangement hitherto has depended on the variation of the back-pressure when a fluid such as air is bubbled from the lower end of a dip tube through liquid in the tank. When only a small amount of the dip tube is immersed there is little resistance to the escape of fluid from the tube and the back pressure is correspondingly low. As the immersed depth increases the back pressure rises until, if the pressure is insufficient, the lower end of the tube is filled with liquid and bubbles do not issue from it, the back pressure then being the supply pressure. In such a system it is then only necessary to measure the back pressure when bubbling and from this calculate the immersed depth of the dip tube.

However on marine tankers various problems arise. Firstly the vessel is large, usually 200 or 300 feet long, and it is convenient to concentrate instrumentation at one point, usually aft, where the rest of the ship controls are situated. It is therefore necessary to transfer the back pressure from the deck unit on each tank top to a remote point at which the pressure is displayed and the necessary measurements made. Secondly because of the height of liquid covering the dip tube in a full tank, which may be up to 30 feet, it is usually necessary to use a manometer filled with mercury as the measuring instrument to avoid too lengthy and cumbersome device. A pressure gauge is not generally suitable as often incremental rather than absolute measurements are required. Thirdly the methods of this type used hitherto produce a direct fluid connection between the product tank and the remote location. This causes two hazards, namely that of gas entering the remote location and that of liquid products entering the remote location. Because of the risk of gas at the remote location is necessary to regard this as a "hazardous area" and all the equipment in the vicinity must be appropriately designed and protected. This means that all electrical equipment must be of a very restricted design and sealed in cumbersome cabinets to avoid explosion. Because of the direct liquid connection and the normal use of a pressurized tank it is possible for liquid product to be pumped through the back pressure connection to the remote location thus contaminating the instruments and making them inaccurate even if no product is actually released into the remote location. Despite these many disadvantages the arrangements described above have worked to an extent which is just about acceptable on medium size marine tankers. However with the increase in size of tankers to lengths approaching 1,000 feet the problems have become much more significant. Thus the sheer length of the pipe connections and the multitude of joints that are required have led to total leakages which cannot be remedied and which are of the same order as the pressures being measured. Furthermore as the tanks have become deeper and economic pressure to use the tanks to the utmost extent increases it has become the practice to use a plurality of dip tubes of different lengths to enable more accurate measurements at the critical upper level in the tank. This usually requires a change-over valve to be installed in the tank top deck unit and this valve must be operated from the remote location. Extended piping and the increased losses through the valve further reduce the accuracy of the arrangement. Attempts have been made to refine the present arrangements to overcome the shortcomings but they have not been successful nor, in general, acceptable to the tanker fleet owners and operators or to the port authorities who are becoming increasingly critical of overspill and pollution.

Accordingly the present invention proposes an improved level sensing arrangement particularly for marine tankers which is wholly pneumatic in operation while providing a very much improved accuracy and reliability of operation.

Referring to FIG. 1 this shows a depth-gauging arrangement for a tanker having a tank which is at non-atmospheric pressure. The non-atmospheric pressure may be sub- or super-atmospheric. The tank top is shown at TT and the housing for the equipment on the tank top, the deck unit, is indicated at DU. The remote location is indicated at RL and this would conventionally be a control console installed in the aft superstructure of the tanker. The tank is provided with conventional dip tubes, DL for the full depth of the tank and DH for the top say two metres of the tank. There is also a balance pipe BA to transfer the non-atmospheric pressure to the deck unit. The dip tubes and balance pipe each have a respective isolating valve V1, V2, V3. The deck unit receives a fluid pressure supply at some 50 p.s.i. from a common source, conveniently located at the remote location, and controlled by an on-off valve V5. The fluid from the common source, which is conveniently compressed air, is filtered in filter F in the deck unit DU and supplied to a distribtor DIS. The fluid is supplied direct from the distributor to the operators of each of the isolating valves V1, V2 and V3 so that when valve V5 is operated to supply air to the deck unit these valves are in turn operated to put the dip tubes and balance pipe in connection with respective level sensing fluid pressure supplies through the chokes conventionally indicated in the diagram. The supply to the balance pipe passes through a manifold M which will be referred to later. The arrangement also includes two relay valve devices D1 and D2 each responsive to the back pressure from a respective dip tube connected at port C. A further output from the distributor DIS supplies air to a regulator R which supplies air at a stabilised value, in the order of 50 p.s.i., as a transmission fluid pressure supply. A further on-off valve V4 is in the connection between the distributor DIS and the regulator R and this is arranged to isolate the regulator R and connected apparatus except when pressure is supplied from the common source CS attains a set value. Valve V4 is operated through a choked connection to the distributor DIS to delay its operation on the first application of pressure to the distributor. The action of valve V4 should be distinguished from the action of valves V1, V2 and V3 which close off the ends of the dip tubes and balance pipe inside the deck unit when they are not energised by fluid pressure.

Devices D1 and D2 are similar, each including a pile of fluid pressure responsive members in the form of diaphragms. The central portions of the diaphragms are stiffened by followers and the outer edges are clamped between sections of the body of the device leaving a flexible annulous permitting movement of the pile. The cells between adjacent diaphragms are provided with individual ports. The devices are also provided with two distinct bias arrangements to compensate respectively for non-linearity and zero-error in the response. These devices are arranged to produce a linear variation of an output pressure which is the variation in the back pressure applied to port C. The stable transmission pressure from the regulator R is applied to the port S of each relay valve device as a supply pressure and the output pressure derived from the supply pressure in accordance with the control pressure of port C is obtained at port 0. Supply pressure is exhausted at port E and the pressure in the tank is applied through the balance pipe to valve V3 and manifold M to the balance port B of the device. The form of the relay valve devices will be described below with reference to FIG. 3 as it forms no part of the general aspect of the invention. The output pressures from the relay valve devices are supplied to the remote location RL over transmission paths formed by conduits and at the remote location are applied to respective indicators R11, R12 which may be pressure gauges to display a value proportional to the back-pressure at the respective diptube.

In operation of the arrangement of FIG. 1, supply pressure at CS is filtered at F and distributed via DIS to valves V1, V2 and V3 and these open to permit the pressure to be applied to the tubes DL, DH and BA only if the pressure is present. No tank liquid can therefore pass back through valves V1, V2 and V3. It is noted moreover that the supply to BA is via the manifold M which is also connected to the balance port B and exhaust ports E of the relay valves D1 and D2 the latter connection not being shown. Considering the dip tube DL and the balance tube BA, and assuming that tube DL is bubbling the back pressure at input C corresponds to the depth of immersion of tube DL and this pressure will include a fixed amount representing the pressure above the liquid as present at the tube BA which is fed back as a balance pressure to D1 via manifold M. Valve D1 therefore relays to the indicator R11 a pressure proportional to the depth of immersion of DL. Assuming that DH is initially not immersed, valve D2 operates in the same way as D1 and initially produces no relayed output but as soon as the liquid level in the tank rises to DH indicator R12 connected to relay valve device D2 begins to provide a reading and gives a full scale deflection corresponding to the topping up region covered by tube DH.

The exhaust port of each relay valve can be connected to the manifold M and this is considered permissible because the manifold pressure is merely a balancing pressure acting on the relay valve diaphragms and is self equalising in the system. Clearly, the exhaust ports of valves D1 and D2 may be open to the inside of the casing of DU but since being on a ship's deck, this casing is normally completely sealed, and would normally be provided with a vent connection not shown back into the remote location RL.

If the tank is pressurised with an inert gas for the purpose of reducing the possibility of static electricity causing an explosion therein, it will be appreciated that the venting of any toxic gas into the remote location would be unsafe for personnel and it is clearly in this case preferable to connect the exhausts from the relay valves back into the manifold M.

Various important advantages follow from the inventive arrangement proposed above. Firstly any leak in the transmission path does not adversely affect the operation of the level sensing fluid pressure applied to the dip tube. Instead of the remote indicators at the remote location being connected to a pressure source whose impedance is related to the flow of fluid through the dip tube the remote indicators are now operated by a fluid pressure supply whose source impedance is very much lower being that of the common supply CS controlled by the regulator R. Thus small leaks will not have any significant effect on the accuracy of the system as they neither increase the apparent loss from the dip tube nor affect the pressure indicated at the remote location. Furthermore there is now no direct path possible from the product tank to the remote location and for a path to be provided at least three elements must fail. Thus the isolating valves V1, V2 and V3 each protect the respective tube where it enters the deck unit DU while the pilot diaphragms in each of the devices D1 and D2 prevents direct connection between the port C and the port O and furthermore the transmission fluid pressure will not easily act to assist flow of product to the remote location. Another important advantage is the simplification and reduction in length of the level sensing fluid pressure circuit. This is now contained wholly within the deck unit DU and extends from the distributor DIS through the indicator to supply chokes to the control port C of the respective device and to the isolating valve of the respective dip tube. All the components indicated as being contained in the deck unit can be assembled into the unit before installation on the tank top and, if required, tested before installation as a complete unit. As the operation of the isolating valve is now linked to the supply of pressure from the remote location there is no need to provide extra operating control paths from the remote location and the number of connections is greatly reduced. Thus there need only be the supply path and the two return transmission paths to provide an indication of the product depth over the full height of the tank and also in the critical last two metres of the height. If required it is also possible to derive a specific gravity indication, represented by remote indicator R13, knowing the difference in the immersion depth of DL and DH and measuring the pressure differences from the two devices D1 and D2.

The arrangement of FIG. 1 is equally applicable to super-and sub atmospheric pressurisation of the tanks since by connecting the balance pipe BA through the manifold M to the ports B and E of the device D1 and D2 a true pressure differential will always be applied to the devices and this will compensate for any variations in ambient pressure over the liquid in the tank.

A further embodiment of the invention is set forth in FIG. 2. This shows a two-stage ullage sensing arrangement. The ullage is the space above the liquid in a container and as explained above is a critical factor in the economic operation of a marine tanker particularly the so-called super-tanker. Also as explained above it is desirable to fill the tanks as quickly as possible without risking overspill. To this end the arrangement as FIG. 2 provides a two-stage control system for the end of filling of a tank. The bulk of the tank can be filled in the conventional manner if necessary under the supervision of an arrangement such as that shown in FIG. 1 where the full depth dip tube DL and its appropriate indicator will display the depth of liquid in the tank.

The arrangement shown in FIG. 2 has a dip tube T and a balance pipe BA extending into the tank. The dip tube T extends to that part of the tank in which trimming of the final level leaving the required ullage takes place. The dip tube and balance pipe are provided with individual isolating valves V7 and V8 respectively which are similar to the isolated valves referred to in FIG. 1. The dip tube and balance pipe are connected through these valves to respective ports of a back-pressure responsive device D3 which will be described later with reference to FIG. 4. (It is still assumed that the tank being depth-gauged is a non-atmospheric one.) The device D3 preferably includes a pile of diaphragms to one diaphragm of which a selected value of bias pressure may be applied, the pile being displaceable against the bias pressure by the net effect of the back pressures from the dip tube T and the balance pipe BA to control the venting of a port BP to which a further pressure is applied. The further pressure, the pressures applied to the dip tube and balance pipe and the energising pressures for the isolating valves V7 and V8 are all derived from a distributor DIS in a similar manner to that described for FIG. 1. The port BP is so arranged that it vents the further pressure when the diaphragm pile displaced by the back pressure from the dip tube T overcomes the bias pressure. This causes the valve V6 to be released to its unenergised condition and interrupts the connection between the distributor DIS and a pressure switch PS at the remote location RL. The operation of the pressure switch PS can be arranged to sound an alarm connected to terminal AM in any well-known manner.

The bias pressure is applied to terminal P at device D3 and this pressure is derived from the common source pressure CS at the remote location RL. The bias pressure can have two distinct values one corresponding to the liquid level in the tank at which the trimming phase of filling should commence and the other corresponding to the liquid level selected to leave the desired ullage in the tank. As the appropriate bias pressures will vary with the product in the tank and the ambient conditions at the time, equipment is provided at the remote location RL to set the bias pressure to a selected value. Two pressure regulators RTB and RUB are provided for the trimming and ullage levels respectively. The output of one of these pressure regulators may be selected by the manual operation of valve V10. By the manual operation of valve V9 the fluid pressure conduit from valve V10 to the port P of device D3 can be connected or blocked as desired. When the conduit is blocked the pressure gauge B1 will indicate the bias pressure which is being maintained by the selected pressure regulator. This pressure may be adjusted if desired to a value in accordance with the product and ambient conditions.

In operation of the arrangement both regulators would be set to the appropriate bias levels with the valve V9 in the SET position blocking the conduit. The bias would then be selected by the operation of valve V10 and this bias applied to port P of device D3 by the operation of valve V9 to the ON position. The alarm would then sound when the liquid in the tank attained a level at which trimming should commence and the operator in response to the alarm could take the necessary action to control the flow of product into the tank. He would also operate the valve V10 to the ullage condition U so that when the desired ullage was attained the alarm would again sound, having been cancelled by the selection of position U, indicating that filling should cease.

It will be apparent that the arrangement just described has the advantages referred to earlier in connection with FIG. 1 of the use of a transmission signal derived from a low impedance pressure source which in this case is controlled by the action of relay V6 for application to a transmission path to an alarm at a remote location. It will also be apparent that the arrangement just described, being normally operable in a switching mode, is very suitable for modification to an automatic control arrangement as automatic control usually depends on the detection of specific stages at which a switching operation is carried out rather than a continuous change.

Reference is now directed to FIGS. 3 and 4 which show the relay valve devices used in the arrangements of FIGS. 1 and 2 respectively in greater detail.

It will be seen that FIG. 3 shows a valve having a pile of diaphragms which are displaceable by the difference of pressure applied to the bias port B and the control port C, corresponding to those shown in FIG. 1. The movement of the pile controls the operation of a self-lapping valve generally indicated at VS. This is arranged to supply an output pressure at port O, derived from supply pressure at port S, in dependence of a displacement of a pile effected by the displacement of the pile under the difference in pressure applied at ports B and C. This pressure difference represents the immersed depth of a dip tube connected to port C and as more of the tube is immersed and the pressure of port C rises the displacement of the pile will cause the pressure at output port O to be increased thereby the pressure maintained in the chamber connected to output port O via choke CH to also increase and maintain the equilibrium of the pile. In the embodiment illustrated in FIG. 1 the device D1 will have an output pressure which is in a 1:1 relationship with the control pressure variation. It is desirable both that the 1:1 relationship is maintained over the range of operation of the valve and that a zero input pressure at port C produces a zero output pressure at port O. To achieve these results two adjusters are provided on the valve. The first of these, AD1, is in the upper part of the valve as shown in FIG. 3. This adjuster can be set to bring the pile and the self-lapping valve to the position in which there is a 1:1 relationship between the control and output pressures. This compensates for any small manufacturing tolerances which inevitably occur. The other adjuster AD2 can be set to ensure that zero input pressure produces zero output pressure. Both adjusters may be locked in place be set screws so that a valve can be manufactured for accurate operation on a specific value of supply pressure applied to port S. Another feature of the relay valve device which is important in the present application is the provision of the choke CH connecting the output port to the chamber above the pile. This choke provides a restricted passage from the chamber to the output port and slows down the movement of the pile when the control pressure changes. This prevents unwanted variations in the output pressure.

In the device shown in FIG. 3 the dimensions are such that the effective area of the pressure responsive member including the diaphragm operated on by the pressures applied by the balance pipe and the dip tube is equal to the effective area over which the output port pressure is applied. This produces the 1:1 relationship referred to above. However other relationships may be used and these are achieved by adjusting the relative areas of the pressure responsive members.

FIG. 4 shows a preferred form of device D3 of FIG. 2 in more detail. As in the device shown in FIG. 3 there is a pile of pressure responsive members in the form of diaphrams and the appropriate ports to enable pressures to be applied to the diaphragms. The device of FIG. 4 is a switching device rather than an analog device as shown in FIG. 3 and accordingly it is only necessary to adjust the zero-error. This is achieved by the adjuster generally indicated at AD3 which can be set and locked to position the port BP with respect to the valve closure element on the pile of diaphragms. The device shown in FIG. 4 can be said to operate in a switching manner in that once the pressure applied through port C applies a greater load to the pile of pressure responsive members than the combined effect of any pressure applied through ports P and B the port BP is opened by the upward displacement of the pile and the back pressure hitherto sustained by this closed port effected through exhaust E.

Arrangements according to the invention and such as described above include the back-pressure sensitive valve devices which afford a pneumatic power gain in operation which in turn provides a liquid level sensing arrangement in which the bubbling flow through the liquid can be reduced to the minimum level to avoid, inter alia, the risk of the generation of static electricity in the tank while permitting an accurate transfer of a signal representing the back-pressure and therefore the immersed depth of the dip tube to a remote location. Furthermore these arrangements can remove the possibility of a manometer at the remote location being "over ranged" back into the deck unit with the consequent risk of corrosion and also danger of poisoning the crew, if mercury is the manometric liquid.

If it is nevertheless desired to still employ conventional manometers, instead of the pressure gauges, whilst still having the capacity to combat the effects of leaks, devices D1 and D2 of the arrangement of FIG. 1 could be arranged to reduce the variation of the back pressure transmitted to the remote location to a fraction of that produced in the deck unit so that a manometer used to measure the pressure output can similarly be reduced in size thus retaining advantages of a mercury manometer without suffering the disadvantages consequent upon the use of such manometers for tanks having an operating depth of up to 100 feet and therefore a manometric height in the order of 8 or 9 feet.

I claim:
1. A pneumatic liquid level sensing apparatus comprising:
   a. a first dip-tube depending into a liquid-containing tank whose liquid level is to be sensed;
   b. a first fluid pressure supply coupled to said first dip-tube for supplying pressurized fluid thereto and for bubbling fluid into liquid in the tank when a lower end of said first dip-tube is covered by the liquid;
   c. a first fluid pressure amplifying valve means coupled to said first dip-tube for sensing the back pressure therein when said first dip-tube is bubbling, said first valve means having a control port for receiving said back pressure, an inlet port and an outlet port;
   d. a second fluid pressure supply coupled to said inlet port of said first valve means so that said first valve means receives fluid from said second fluid pressure supply;
   e. a first fluid pressure signal transmission conduit coupled to said outlet port of said first valve means and leading to a first remotely located fluid pressure indication means;
   f. said first valve means including a fluid pressure responsive member disposed between said control, inlet and outlet ports such as to cause fluid pressure from said outlet port to said first indicator means to be dependent on said back pressure applied to said control port;
   g. a second dip-tube having a lower end depending into said tank to a point above peak liquid level;
   h. a manifold connected to said first fluid pressure supply and to an upper end of said second dip-tube;
   i. said first valve means including a balancing pressure port coupled to said manifold to receive pressure in said tank above any liquid therein and from said first fluid pressure supply, and to transfer said pressure to said fluid responsive member to render the fluid pressure from said outlet port independent of pressure within said tank above the liquid;
   j. a third dip-tube depending into said tank to a point below but near peak liquid level, said first pressure supply being coupled to said third dip-tube to supply pressurized fluid thereto and bubble fluid into the liquid in the tank when a lower end of said third dip-tube is covered by the liquid;
   k. a second fluid pressure amplifying valve means coupled to said third dip-tube to sense the back pressure therein when said third dip-tube is bubbling, said second valve means having a control port for receiving said back pressure, an inlet port for receiving fluid from said second fluid pressure supply, and an outlet port coupled to a second fluid pressure signal transmission conduit leading to a second remotely located pressure indicator means, said second valve means further including a fluid pressure responsive member disposed between said control, inlet and outlet ports such as to cause fluid pressure from said outlet port to said first indicator means to be dependent on said back pressure applied to said control port, and said second valve means further including a balancing pressure port coupled to said manifold to receive pressure in said tank above any liquid therein and from said first fluid pressure supply, and to transfer said pressure to said fluid responsive member to render the fluid pressure from said outlet port independent of pressure within said tank above the liquid.

2. Sensing apparatus as claimed in claim 1, wherein said first dip-tube is coupled to the tank by way of an isolating valve, said isolating valve being responsive to the presence of pressure from said first fluid pressure supply to connect said dip-tube to said valve means and being responsive to the absence of pressure from said first fluid pressure supply to isolate said dip-tube from the exterior of said tank.

3. Sensing apparatus as claimed in claim 1, wherein said second dip-tube is coupled to the tank by way of a further isolating valve, said further isolating valve being coupled to said first fluid pressure supply and being responsive to the presence of pressure from said first fluid pressure supply to connect said further dip-tube to said valve means and being responsive to the absence pressure from said first fluid pressure supply to isolate said further dip-tube from the exterior of said tank.

4. Sensing apparatus as claimed in claim 1, wherein said first and second fluid pressure amplifying valve means comprises a self-lapping relay valve.

5. A pneumatic liquid level sensing apparatus comprising:
   a. a dip-tube depending into a liquid contained in a tank whose liquid level is to be sensed;
   b. a first fluid pressure supply coupled to said dip-tube for supplying pressurized fluid thereto and for bubbling fluid into liquid in the tank when a lower end of said dip-tube is covered by the liquid;
   c. a fluid pressure amplifying valve means coupled to said dip-tube for sensing the back pressure therein when said dip-tube is bubbling, said valve means having a control port for receiving said back pressure, an inlet port, an outlet port and an exhaust port;
   d. a second fluid pressure supply coupled to the said inlet port of said valve means so that said valve means receives fluid from said second supply;
   e. a fluid pressure signal transmission conduit coupled to said outlet port of said valve means and leading to a remotely located fluid pressure indicator means;

f. said valve means including a fluid pressure responsive member disposed between said control, inlet, exhaust, and outlet ports for, responsive to said back pressure at the control port, selectively connecting said outlet port and to said exhaust port so as to alternatively supply fluid from said second supply to said outlet port and to exhaust fluid from said outlet port such as to cause fluid pressure delivered to the outlet port and then to said indicator means to be dependent on said back pressure, and thus to sense and indicate the level of liquid above the bottom end of said dip-tube;

g. a further dip-tube depending into said tank to a point below but near peak liquid level, said first fluid pressure supply being coupled to said further dip-tube to supply pressurized fluid thereto and bubble fluid into liquid in the tank when a lower end of said further dip-tube is covered by the liquid;

h. a further fluid pressure amplifying valve means coupled to said further dip-tube to sense the back pressure therein when said further dip-tube is bubbling, said further valve means having a control inlet port for receiving said back pressure from said further dip-tube, said second fluid pressure supply being coupled to said further valve means, and further valve means having an inlet port for receiving fluid from said second supply, and outlet port coupled to a further fluid pressure signal transmission conduit leading to a further remotely located pressure indicator means, and an exhaust port, said further valve means further including a fluid pressure responsive member disposed between said control, inlet, exhaust, and outlet ports for, responsive to said back pressure from said further dip-tube at the respective said control port, alternately connecting the respective outlet port to the respective inlet port and to the respective exhaust port so as to alternately supply fluid from said second supply to the respective outlet port and to exhaust fluid from the respective outlet port such as to cause fluid pressure delivered to the respective outlet port and thence to said further indicator means to be dependent on the back pressure in said further dip-tube, whereby to sense and indicate liquid level while the tank is topping up with liquid; and i. a third fluid pressure indicator means coupled between the first mentioned fluid indicator means and said further fluid pressure indicator means for indicating pressure differences therebetween.

* * * * *